US005197709A

United States Patent [19]

Kroll et al.

[11] Patent Number: 5,197,709

[45] Date of Patent: Mar. 30, 1993

[54] ELECTROMAGNETIC DIRECTIONAL CONTROL VALVE

[75] Inventors: Peter Kroll, Gemmrignheim; Günter Neumann, Freiberg-Beihingen; Volkmar Leutner, Friolzheim, all of Fed. Rep. of Germany

[73] Assignee: Robert Bosch GmbH, Stuttgart, Fed. Rep. of Germany

[21] Appl. No.: 773,903

[22] PCT Filed: May 9, 1990

[86] PCT No.: PCT/DE90/00327

§ 371 Date: Oct. 29, 1991

§ 102(e) Date: Oct. 29, 1991

[87] PCT Pub. No.: WO90/13749

PCT Pub. Date: Nov. 15, 1990

[30] Foreign Application Priority Data

May 10, 1989 [DE] Fed. Rep. of Germany ....... 3915223

[51] Int. Cl.[5] ...................... F16K 31/06; F15B 13/044

[52] U.S. Cl. .......................... 251/129.15; 137/625.65; 251/129.1; 251/337

[58] Field of Search ................ 137/625.65; 251/129.1, 251/129.15, 337

[56] References Cited

U.S. PATENT DOCUMENTS

| | | | |
|---|---|---|---|
| 3,967,648 | 7/1976 | Tirelli | 137/625.65 |
| 4,422,475 | 12/1983 | Aspinwall | 137/625.65 X |
| 4,548,383 | 10/1985 | Wolfges | 137/625.65 X |
| 4,611,632 | 9/1986 | Kolchinsky et al. | 137/625.65 |

FOREIGN PATENT DOCUMENTS

| | | |
|---|---|---|
| 2317495 | 10/1973 | Fed. Rep. of Germany . |
| 2943714 | 5/1981 | Fed. Rep. of Germany . |

*Primary Examiner*—Gerald A. Michalsky
*Attorney, Agent, or Firm*—Michael J. Striker

[57] ABSTRACT

An electromagnetically actuated directional control valve has a housing having a chamber, a control slider guided in the housing so as to be longitudinally movable, a restoring device centering the control slider and including a restoring spring and a spring plate, a magnet having an armature which can deflect the slider into a working position against a force of the restoring spring, a pressure tube communicating with the chamber in the housing via a pressure medium and receiving the armature. The pressure tube receives the restoring spring and the spring plate in its interior. The pressure tube also has a support which prevents the spring plate from falling out.

3 Claims, 1 Drawing Sheet

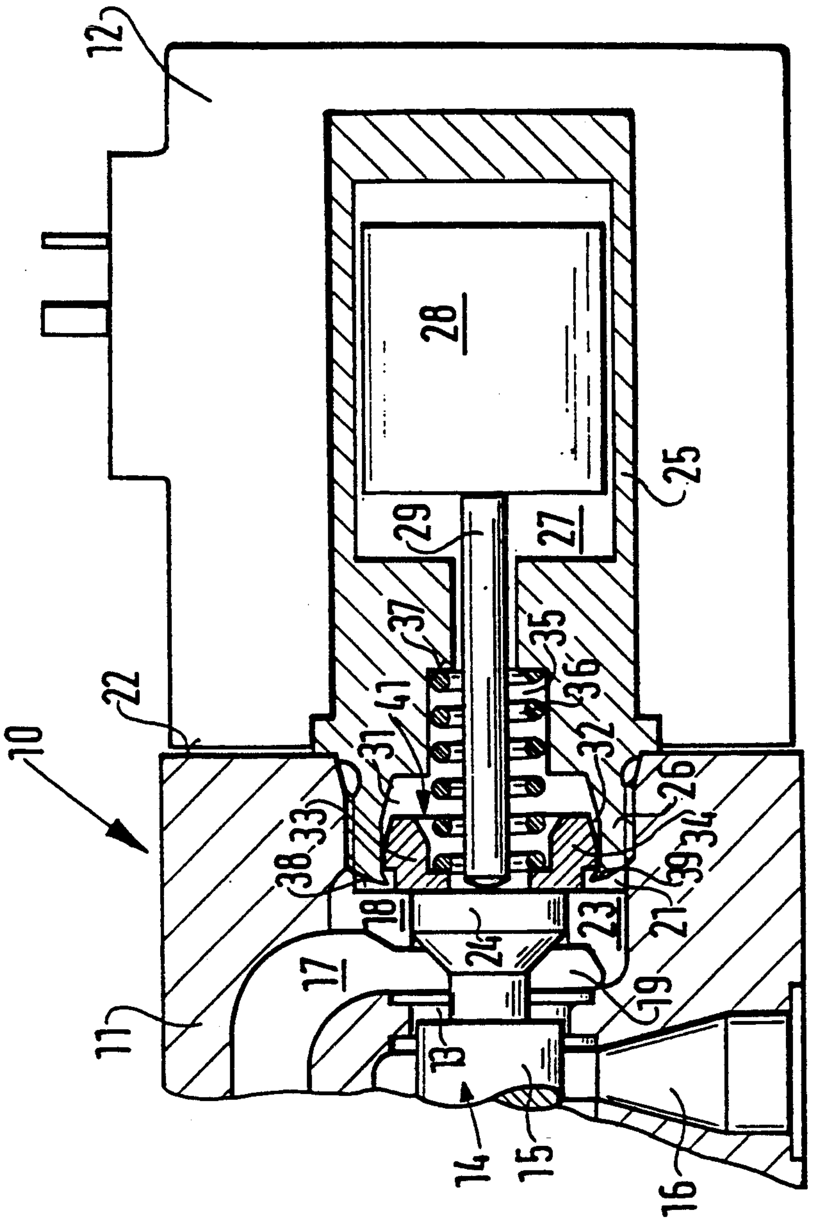
10
11
12
13
14
15
16
17
18
19
21
22
23
24
25
26
27
28
29
31
32
33
34
35
36
37
38
39
41

ELECTROMAGNETIC DIRECTIONAL CONTROL VALVE

BACKGROUND OF THE INVENTION

The invention relates to an electromagnetically actuated directional control valve.

Such an electromagnetically actuated directional control valve, in which a longitudinally movable control slider can be brought into different switching positions by a resetting device and at least one magnet, is already known from U.S. Pat. No. 3,967,648. The resetting device is constructed in such a way that a spring plate and a restoring spring are assigned to each front side of the control slider and, in a three-position valve construction, center the control slider in a central position. A deflection in opposite directions can be effected by means of actuating two magnets. Each magnet comprises a pressure tube. An armature is guided in the interior of the latter, which interior is filled with pressure medium. A disadvantage in this construction consists in that the restoring springs and the spring plates are structural component parts which are separate from the valve housing and from the magnets and must be dealt with separately and installed carefully when assembling the magnets at the valve housing, which increases the assembly cost. Such separate parts can also be lost or incorrectly installed when exchanging a magnet. Further, this construction can have a disadvantageous effect on the overall length of the magnet valve.

Further, a magnet valve in which a valve bush with annular flange is undetachably held at the base of a magnet housing by means of flanging is known from DE-PS 33 07 554. If this magnet housing comprising a valve bush is assembled with a valve housing, tensions in the structural component parts, which could otherwise occur as a result of angular deviations of the longitudinal axes of the magnet and valve bush, are prevented. A resetting device comprising a spring plate is not provided in this patent.

Further, it is known from DE-OS 23 17 495 to hold individual structural components in a magnet valve so as to be undetachable by means of flanged connections in other structural components. This magnet valve is constructed as a seat valve and has no resetting device comparable to that of a directional control valve.

SUMMARY OF THE INVENTION

Accordingly, it is an object of the present invention to provide an electromagnetically actuated directional control valve which avoids the disadvantages of the prior art.

In keeping with these objects and with others which will become apparent hereinafter, one feature of the present invention resides, briefly stated, in an electromagnetically actuated directional control valve in which a pressure tube of at least one magnet receives a restoring spring with a respective spring plate in its interior, and the pressure tube has a support which prevents the spring plate from falling out. The electromagnetically actuated directional control valve in accordance with the present invention has the advantage over the prior art that it comprises complete preassembled functional units which enable a simple and secure assembly at the directional control valve housing. The substantial parts of the resetting device, such as the restoring spring and spring plate, are now integrated in the pressure tube of the magnet and undetachably held in the latter, so that this functional unit can be handled easily and can also be stocked. The spring plate and restoring spring are also undetachable and accordingly also protected against incorrect assembly during a subsequent dismantling of the directional control valve. The guidance of the restoring spring and spring plate in the pressure tube can be ensured at low cost and in a simple manner. In addition, this functional unit favors a short overall length of the directional control valve and particularly a short overall length of the control slider at which guide elements are no longer necessary. Further, the functional unit can be used in different types of valves and can be inexpensively produced.

The directional control valve of the invention, has a simple, space-saving, inexpensive construction.

In accordance with another feature of the present invention the pressure tube has a hollowed out portion on its valve side in which the spring plate is guided with its outer circumference.

The pressure tube can be provided with a sleeve-shaped portion which projects into the housing.

The pressure tube can also have flanges at its front edge projecting into the housing as a support for the spring plate.

The spring plate in turn can have a collar serving as a stop, and the collar can be arranged at a distance from its assigned support, particularly the flanges when contacted by the spring plate so as to be fixed with respect to the housing.

The restoring spring can be guided by its ends in the spring plate and in the cut out portion of the pressure tube.

The pressure tube in accordance with another feature of the present invention, can be screwed into the housing and in particular by its sleeve-shaped portion.

Finally, the directional control valve can be constructed either as a two-position valve with a magnet or as a three-position valve with two magnets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a simplified view of a portion of an electromagnetically actuated directional control valve in accordance with the present invention.

DESCRIPTION OF THE PREFERRED EMBODIMENTS

The drawing shows a longitudinal section through a portion of an electromagnetically actuated directional control valve 10, a switching magnet 12 being mounted on the front side of its valve housing 11.

A longitudinally movable control slider 14, which can occupy different switching positions, is guided in a slider bore hole 13 in the valve housing 11. It is assumed that the valve housing 11 is part of a 4-way three-position valve, known per se, in which the control slider 14 is centered in the illustrated center position by means of spring force. The second magnet of the directional control valve 10, which is symmetrically constructed per se, is therefore not shown in more detail for the sake of simplicity. A piston portion 15 separates a consumer connection 16 from a return chamber 17 in the shown center position of the control slider 14. This return chamber 17 is divided, by means of two webs 18 extending in an approximately semicircular shape, into an inner chamber 19 and an outer chamber 21 which extend up to a front side 22 of the valve housing 11. The two annular webs 18 are formed by means of slots 23 which extend in the drawing plane, so that a good pressure medium connection is produced between the two chambers 19 and 21 on the one hand and a piston end 24 of the control slider 14 can be guided so as to be free of vibrations on the other hand. This construction of the valve housing 11 is known per se, e.g. from DE-OS 29 43 714.

The magnet 12 is mounted at the front side 22 of the valve housing 11, wherein a pressure tube 25 of the magnet 12 is tightly and securely screwed with a sleeve-shaped portion 26 into an outer chamber 21. An interior 27 of the pressure tube 25 which communicates with the return chamber 17 via a pressure medium receives an armature 28 which can act on the control slider 14 via a tappet 29 for actuating the control slider 14.

The pressure tube 25 comprises a cylindrical stepped hollowed out portion 31 in the area of the sleeve-shaped portion 26; a spring plate 33 is guided into the outer area 32 of the hollowed out portion 31, which has a greater diameter, in a sliding manner by its collar 34 which is formed on at the outside. A restoring spring 36, which is supported at a step 37 of the pressure tube 25 on the one hand and in the spring plate 33 on the other hand, is guided into an inner area 35 of this hollowed out portion 31. The sleeve-shaped portion 26 comprises inwardly projecting flanges 39 at its edge 38 which projects into the return chamber 17. These flanges 39 form a support which holds the spring plate 33 in the pressure tube 25 so as to be undetachable when the magnet 12 is removed from the valve housing 11, the spring plate 33 being guided in the area 32 and loaded by the restoring spring 36. The spring plate 33 and restoring spring 36 accordingly form parts of a resetting device 41 which is integrated in the pressure tube 25 in this manner and forms a functional unit together with it.

The spring plate 33 is supported in the shown center position of the control slider 14 on the one hand at a stop which is fixed with respect to the housing, which stop is formed by the semicircular webs 18. At the same time, the control slider 14 contacts the spring plate 33 with its piston end 24. In this center position, the collar 34 of the spring plate 33 is at a distance from the flange 39 serving as support, so that the control slider 14 is centered in its center position by means of the restoring spring 26 and by means of the other resetting device in the second magnet, not shown in more detail. In order to achieve a deflection of the control slider 14 to the left, with reference to the drawing, the magnet 12 is actuated so that the armature 28 deflects the control slider 14 against the spring force of the resetting device, not shown, via a tappet 29. The spring plate 33 contacts its stop 18, which is fixed with respect to the housing, in an unchanged manner accompanied by the force of the spring 36. On the other hand, if the control slider 14 is deflected to the right by the actuation of the magnet, not shown, the spring plate 33 is adjusted against the force of the restoring spring 36 in the direction of the interior 27 of the pressure tube 25. When the magnet is subsequently switched off, the resetting device 41 centers the control slider 14 in the shown center position again.

When the pressure tube 25 is unscrewed from the valve housing 11 when disassembling the magnet 12, the spring plate 33, which is loaded by the restoring spring 36, rests against the flanges 39 after overcoming a defined clearance lift and is prevented from falling out by means of these flanges. The restoring device 41 is accordingly undetachably integrated in the pressure tube 25 and facilitates the assembly or dismantling of the directional control valve 10. The spring plate 33 and restoring spring 36 can be guided in the pressure tube 25 in a simple and inexpensive manner. Therefore, additional guidance means for parts of the resetting device 41 can be dispensed with at the control slider 14 itself. Further, installing the resetting device 41 in the pressure tube 25 benefits a short construction of the control slider 14.

Of course, it is possible to change the shown embodiment form without departing from the concept of the invention. The functional unit consisting of the pressure tube 25 and resetting device 41 can easily be used in directional control valves for two, three or more switching positions. Of course, the supporting function can also be carried out by an insertable spring ring or by comparable means instead of by the shown flange 39. The magnet can also easily be a proportional magnet instead of the described switching magnet.

It will be understood that each of the elements described above, or two or more together, may also find a useful application in other types of constructions differing from the types described above.

While the invention has been illustrated and described as embodied in an electromagnetically actuated directional control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetically actuated directional control valve, comprising a housing having a chamber; a control slider guided in said housing so as to be longitudinally movable; a restoring device centering said control slider and including a restoring spring and a spring plate; a magnet mounted on said housing and having an armature which can deflect said slider into a working position against a force of said restoring spring; webs mounted on said housing and extending into said chamber; a pressure tube communicating with said chamber in said housing via a pressure medium and receiving said armature, said pressure tube receiving said restoring spring and said spring plate in its interior, said pressure tube having a support which prevents said spring plate from falling out, said pressure tube having a sleeve-shaped portion which projects into said housing and also having a hollowed-out portion in which said spring plate is guided with its outer circumference, said spring plate having a collar serving as a stop and being at a distance from said support when said spring plate abuts against said webs which are mounted on said housing and extend into said chamber.

2. An electromagnetically actuated directional control valve as defined in claim 1, wherein said pressure tube has a front edge provided with flanges, said flanges projecting into said housing so as to form said support for said spring plate.

3. An electromagnetically actuated directional control valve as defined in claim 1, wherein said pressure tube has a cut out portion, said restoring spring having ends guided in said spring plate and said cut out portion of said pressure tube.

* * * * *